US011682237B1

(12) United States Patent
Borenstein et al.

(10) Patent No.: US 11,682,237 B1
(45) Date of Patent: Jun. 20, 2023

(54) SYSTEM FOR LEARNING AND TRACKING PERFORMANCE OF ACTIVITIES

(71) Applicant: AMAZON TECHNOLOGIES, INC., Seattle, WA (US)

(72) Inventors: Eran Borenstein, Zichron Yaakov (IL); Guy Adam, Tel Aviv (IL); Dotan Kaufman, Netanya (IL); Ianir Ideses, Raanana (IL); Eduard Oks, Redmond, WA (US); Noam Sorek, Herzliya (IL); Lior Fritz, Seattle, WA (US); Omer Meir, Seattle, WA (US); Imry Kissos, Redmond, WA (US); Matan Goldman, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/012,662

(22) Filed: Sep. 4, 2020

(51) Int. Cl.
*G06K 9/00* (2006.01)
*G06V 40/20* (2022.01)
*G06T 7/70* (2017.01)
*G06F 18/22* (2023.01)

(52) U.S. Cl.
CPC .............. *G06V 40/23* (2022.01); *G06F 18/22* (2023.01); *G06T 7/70* (2017.01)

(58) Field of Classification Search
None
See application file for complete search history.

(56) References Cited

U.S. PATENT DOCUMENTS

| 9,710,920 | B2* | 7/2017 | Utsunomiya | G06K 9/00348 |
|---|---|---|---|---|
| 9,870,622 | B1* | 1/2018 | Lu | G16H 20/30 |
| 10,755,466 | B2* | 8/2020 | Chamdani | G06F 3/014 |
| 10,898,755 | B2* | 1/2021 | Kang | G06T 7/251 |
| 2012/0190505 | A1* | 7/2012 | Shavit | A63B 24/0062 482/8 |
| 2012/0289296 | A1* | 11/2012 | Marty | G06T 13/20 463/3 |
| 2013/0171601 | A1* | 7/2013 | Yuasa | A61B 5/744 434/258 |
| 2018/0154215 | A1* | 6/2018 | Ryu | A63B 71/0622 |
| 2019/0366153 | A1* | 12/2019 | Zhang | A63B 24/0062 |

* cited by examiner

*Primary Examiner* — Soo Jin Park
(74) *Attorney, Agent, or Firm* — Lindauer Law, PLLC

(57) ABSTRACT

A first user generates video data for performance of an activity, such as a fitness exercise, by performing the activity in front of a camera. Based on the video data, the amount of movement of different parts of the first user's body is determined. Data representing the position of the first user over time is generated. The data may take the form of a function or a signal that is based on the function. The locations of body parts that move significantly are prioritized over other body parts when determining this data. At a subsequent time, a second user performs the activity. The number of times the second user completes the activity is counted by determining the number of times the second user reaches a position corresponding to a maximum value in the data representing the position of the first user.

21 Claims, 7 Drawing Sheets

SYSTEM FOR LEARNING AND TRACKING PERFORMANCE OF ACTIVITIES

BACKGROUND

Videos may be used to provide instruction to users for performing various types of activities, such as fitness exercises. In some cases, a user may attempt to perform an activity demonstrated in a video by an instructor or by another user. Two videos may be compared to attempt to determine whether a user in a first video has correctly performed the activity presented in a second video, and a number of times that the user has done so, such as by counting repetitions of a fitness exercise. However, comparison processes may be computationally intensive and subject to inaccuracy.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
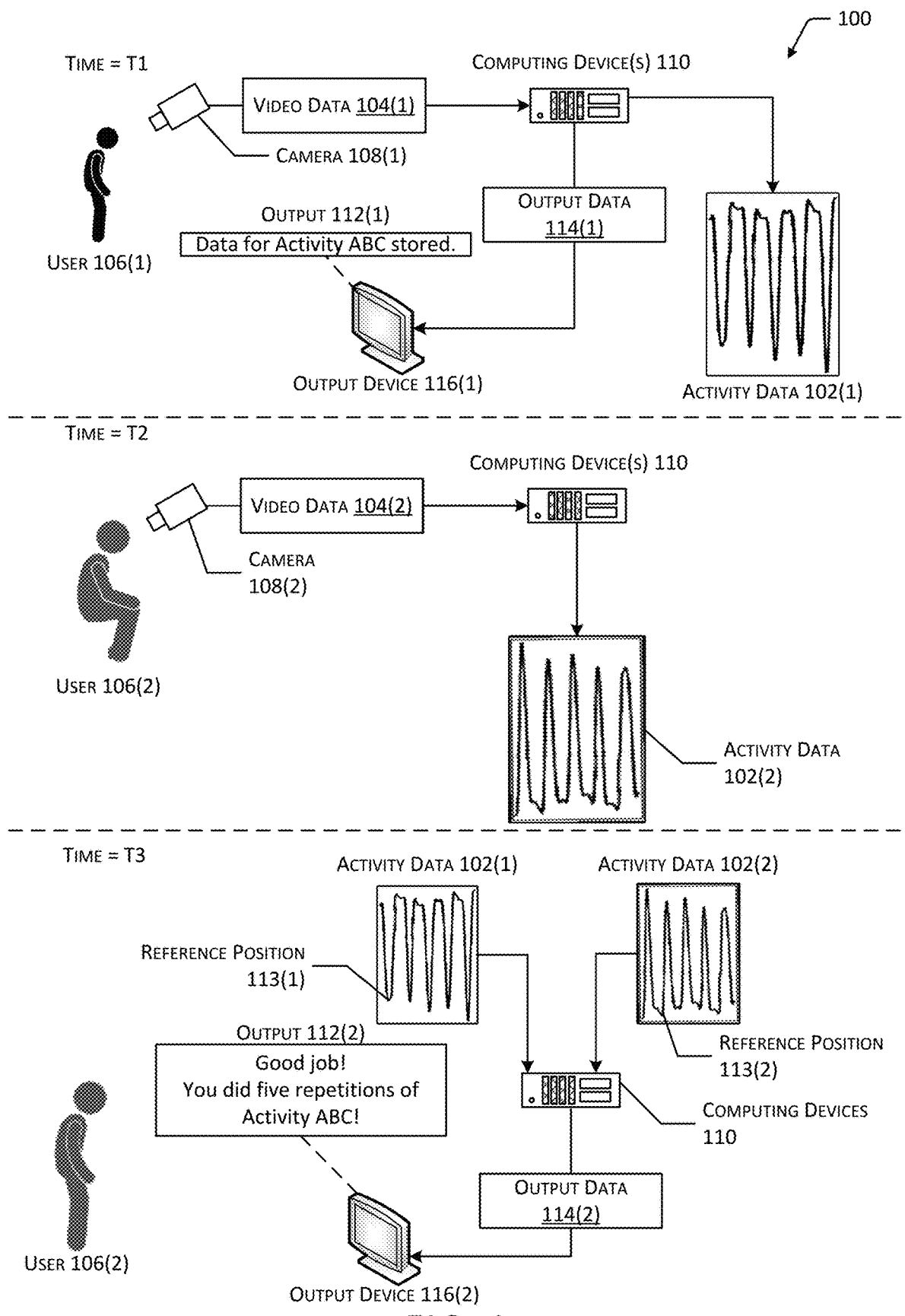
FIG. 1 depicts an implementation of a system for generating activity data based on video data acquired from a first user, then determining performance of the activity by a second user.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Users may access a variety of videos that provide instruction for performance of activities. As one example, a video may provide instruction for performance of a fitness exercise, such as by depicting an instructor performing one or more exercises while providing verbal instruction. A user may attempt to perform the exercise by mimicking the movement of the instructor. In some cases, the user may perform the exercise within a field of view of a camera, and correct or incorrect performance of the exercise may be determined based on video data acquired by the camera. However, comparisons between video data acquired by a camera and video data that presents instructional content may be computationally intensive, and may be subject to inaccuracy. Additionally, available instructional content may be limited, and manually training a computer system to recognize, evaluate, and count repetitions for performance of new activities may be time consuming and use significant computational resources.

Described in this disclosure are techniques for enabling a user to create video data for future performance of an activity. At a subsequent time, other users may perform the activity, and the video data may be used to determine the number of repetitions of the activity that are performed by the other users. In some implementations, the number of repetitions that are performed may be determined in real-time, such as by counting individual repetitions of a fitness exercise as they are completed. The video data may also be used to determine correct or incorrect performance of the activity by the other users. A first user seeking to create video data representing an activity may perform the activity within a field of view of a camera. For example, the first user may perform a small number of repetitions of a fitness exercise. Based on video data acquired from the camera, poses of the first user at different times may be determined. Each pose may be represented by a set of points, each point representing the location and orientation of a body part of the user, such as positions of the user's knees, feet, hips, head, and so forth. In some implementations, the determined locations of one or more points may be relative to the locations of one or more other points. For example, a point representing the location of a user's elbow may be represented as a coordinate location within a frame of video data, or as a location relative to the location of a user's hand.

A subset of the points representing the pose may be used to generate first data representative of the motion and position of the user. In some implementations, the first data may include a function that represents the position of one or more body parts of the user over time, such as a weighted average position of the user. In some cases, the function may be represented as a one-dimensional signal. In other cases, the function may represented as a multi-dimensional signal, however the multi-dimensional signal may have fewer dimensions than the determined poses of the user, which may be represented by numerous points. For example, a subset of points used to determine the first data may be selected by performing a mathematical function that optimizes the points representing the poses of the user to maximize total variance (e.g., movement of a point) while minimizing local variance (e.g., the second derivative of the position of the point overtime). For example, the feet of a user performing a squatting exercise may remain relatively stationary, while the head of the user may move a significant vertical distance relative to the user's feet when performing the exercise. As a result, a function that represents the position of the user performing the squatting exercise may be determined by associating a larger weight, priority, or importance to a point representing the position of the user's head and a smaller weight, priority, or importance to points representing the positions of the user's feet. In some implementations, the function representing the position of the user may be determined by solving an eigen-values problem, such as by using Principal Component Analysis (PCA).

The first data representative of the position of the user over time may be stored as a representation of the activity performed by the user. The stored first data may then be used at a future time to determine a number of times (e.g., a count of repetitions) that the activity is performed by the same user or other users. For example, a point on a signal representing the determined function may represent a maximum deviation from an average value. This point may be used for counting repetitions of an action. When the activity is subsequently performed by another user, a function for the subsequent performance of the activity by the other user may be determined. Each time that the function for the subsequent performance of the activity reaches a position that corresponds to the point representing the maximum deviation from the average value on the function for the first data, this may represent a completed repetition of the action. In another implementation, each time that the function determined for the subsequent performance of the action crosses a point associated with the average position (e.g., a zero-crossing value) of the first function, these zero-crossings may be used to determine a number of repetitions of the activity. In some cases, crossing the point associated with the average position twice may constitute a single repetition of the activity.

Therefore, at a subsequent time, when the same user or a different user performs the activity within the field of view of a camera, the first data may be used to determine a number of times (e.g., repetitions) that the activity is performed. Video data of the subsequent performance may be acquired, and poses of the user may be determined based on the video data. The positions of one or more points represented by the poses, relative to the positions indicated in the initial video data, may be used to determine performance of the action. In some implementations, the video data for the subsequent performance may be used to generate second data, which may represent a function of the position over time for the subsequent performance of the activity. The second data may then be compared to the first data to determine a number of times the activity is performed. Additionally, in some implementations, the second data may be used to determine a rate of movement and an acceleration associated with the subsequent performance of the activity. For example, the second data may include a function representing the position of a user over time. A derivative of this function may represent the velocity of the user over time. A derivative of the velocity of the user may represent the acceleration of the user over time. In some cases, the velocity or acceleration of the user may be used to determine other information. For example, the velocity of a user may be used to determine a quantity of calories used to perform an activity, a physical intensity of the activity, and so forth. The acceleration of a user may be used to determine noise or other inaccuracy associated with the movement of one or more points. For example, points associated with a minimum value for acceleration may have lower local variance, and use of such points to determine a function representing an activity may reduce inaccuracy in the resulting signal.

Points representative of the poses determined during the subsequent performance of the activity may also be compared to points representative of the poses determined during the initial performance of the activity to determine possible errors in the subsequent performance. For example, if the position of a point representing the location of a user's hips differs from a corresponding point determined during the initial performance of the activity by at least a threshold amount, information regarding this difference may be presented during or after the subsequent performance of the activity. Additionally, a signal representative of the function determined during the initial performance of the activity may be compared to a signal representative of the function determined during subsequent performance of the activity to determine potential errors in the subsequent performance. For example, a signal for a subsequent performance having a different shape or average position than a signal for the initial performance may indicate one or more errors.

Implementations described in the present disclosure may therefore enable a first user to generate video data representing performance of an activity efficiently, such as by performing a small number (e.g., from three to five) of repetitions of the activity within a field of view of a camera. Movement and orientation of multiple body parts of the user may be analyzed, such as by using a Principal Component Analysis (PCA) or other type of analysis, to generate a function that optimizes the points representing the position of the first user to maximize total variance while minimizing local variance. If insufficient information to generate the function is determined from the video data, the first user may be prompted to perform additional repetitions of the activity or to change the orientation of the first user relative to the camera. If sufficient information to generate the function is determined, the function may be generated. In some implementations, the function may be generated in response to determining sufficient information. In other implementations, the function may be generated in response to completion of the activity by the user, which may be indicated by user input or a lack of movement. Generation of a signal, based on the function, that represents the position of the user over time may enable more efficient storage of data representative of the activity and more efficient comparisons of this data to other data when the activity is performed by other users. Conversely, each frame of the initial video data may include values for each point representing a location and orientation of many body parts of the user, such as coordinate locations and orientation values for twenty-six body parts, which may be more computationally intensive to store and to compare with other data.

Generation of a signal based on the function may also enable accurate determination of repetitions of the activity performed at a subsequent time. For example, a point on a one-dimensional signal that represents a maximum deviation from an average value (e.g., a peak on the signal) may be used to count repetitions. Each time that a signal representing subsequent performance of the activity by a user reaches a point that corresponds to a point of maximum deviation, this may represent a completed repetition of the activity. This comparison may be more accurate and less computationally intensive than comparing a pose achieved by a first user, which includes points representing a large number of body parts, with a similar pose achieved by a second user. In some cases, such a comparison may use information that is tangential to the correct or incorrect performance of the activity. For example, correct performance of a squatting exercise may be determined primarily based on the position of a user's knees, hips, and feet throughout a range of motion of the exercise. The position of the user's head may be mostly unimportant regarding correct performance of the exercise. However, with each repetition of the exercise, the user's feet and knees may remain mostly stationary, the user's hips may move a moderate vertical distance, the user's head may move a significant vertical distance, and no portion of the user's body may move a significant horizontal distance. As a result, even though the head of the user may be mostly unimportant for correct performance of the exercise, movement of the head may be used to determine a count of repetitions of the activity. For example, a PCA or other type of analysis or mathematical function that optimizes for maximum total variance and minimum local variance may disregard values for the locations of points representing the pose of the user along a horizontal axis since only minimal horizontal motion occurs. The mathematical analysis may also disregard values for locations of points representing the location of the user's feet and knees along a vertical axis, since these parts of the user's body do not move significantly. The mathematical analysis may associate a large importance or priority with a value for the location of the user's head along a vertical axis, and a smaller importance or priority with a value for the location of the user's hips along a vertical axis. The resulting function may therefore be primarily determined using a subset of the points representing various poses of the user, but may constitute an accurate representation of the position of the user over time and may be used to accurately and efficiently determine future performance of the activity.

FIG. 1 depicts an implementation of a system 100 for generating activity data 102(1) based on video data 104(1) acquired from a first user 106(1), then determining performance of the activity by a second user 106(2). At a first time T1, the first user 106(1) may perform an activity within a field of view of a camera 108(1). For example, the activity may include a fitness exercise, an occupational training activity, and so forth. The camera 108(1) may generate video data 104(1) representative of the performance of the activity by the first user 106(1). One or more computing devices 110 may acquire the video data 104(1) from the camera 108(1). While FIG. 1 depicts the computing device(s) 110 as a server, any number and any type of computing device(s) 110 may be used. For example, the computing device(s) 110 may include one or more personal computing devices, portable computing devices, wearable computing devices, servers, set top boxes, and so forth. In one implementation, the computing device 110 may include a smartphone. For example, the smartphone may include an integrated camera 108 for acquiring the video data 104(1) and a display for presenting output 112. In other implementations, the camera 108(1) may be a separate device that is in wired or wireless communication with a computing device 110. In still other implementations, multiple computing devices 110 may perform the functions described herein. For example, a smartphone or personal computing device in an environment with the user 106(1) may acquire video data 104(1), while one or more separate computing devices 110, such as servers, may analyze or process the video data 104(1).

The computing device(s) 110 may generate activity data 102(1) based on the video data 104(1). In some implementations, the activity data 102(1) may include a linear subspace that captures at least a threshold portion of the movement of the user 106(1) represented in the video data 104(1). For example, for at least a subset of the frames of the video data 104(1), the computing device(s) 110 may determine a pose of the user 106(1). A pose may be represented by a plurality of points, each point associated with a location and orientation of a body part of the user 106(1). For example, a first point may represent a position of an elbow of the user 106(1), a second point may represent a position of a head of the user 106(1), a third point may represent a position of a knee of the user 106(1), and so forth. Each point may be associated with information indicative of one or more of a location of the point within a frame of video data 104(1), a location of the point relative to one or more other points, an angle of the point relative to one or more other points, and so forth.

Data indicative of the pose of the user 106(1) in each frame of the video data 104(1) may be analyzed to determine variance (e.g., movement) associated with at least a subset of the points. For example, if the user 106(1) performs a squatting motion, the knees and feet of the user 106(1) may not move or may move only a small distance, while the head of the user 106(1) may move a significant vertical distance. In such a case, the position of the head of the user 106(1) may more heavily influence the activity data 102(1) that is determined, while the position of the feet of the user 106(1) may be disregarded or may have only a small effect on the determined activity data 102(1). In some implementations, the activity data 102(1) may be determined by solving an Eigen-values problem that optimizes the points determined from the video data 104(1) to maximize total variance and minimize local variance, such as through performance of Principal Component Analysis (PCA) to solve the problem. Activity data 102(1) that optimizes for maximum total variance may be more significantly influenced by body parts of the user 106(1) that move significantly. Activity data 102(1) that optimizes for minimum local variance (e.g., minimum movement between subsequent frames, which may be represented by a minimum value for a second derivative of the position of a point) may reduce inaccuracy by reducing the effect of body parts of the user 106(1) that appear to move irregularly or erratically on the activity data 102(1). Using a PCA, the pose of the user 106(1), represented by a potentially large number of points, may be reduced to a single function that represents the position of the user 106(1) over time. The function may be represented by a one-dimensional signal, as shown in FIG. 1. In other implementations, the function may be represented by a multi-dimensional signal.

For example, pose data extracted from the video data 104(1) may be formulated as indicated in Equation 1 below:

$$X \in R^{NJ} \quad \text{(Equation 1)}$$

In Equation 1, X represents the original video data 104(1), N equals the number of frames of video data 104(1), and J equals the number of point coordinates associated with a pose. For example, a pose may be represented by twenty-six points, each point represented by two coordinates (e.g., a location along the horizontal and vertical axes within a frame of video data 104(1)). In such a case, J would equal fifty-two.

The extracted pose data may be normalized, such as by setting the mean value for the data to equal zero, then the covariance matrix (C) may be defined, as indicated in Equation 2 below:

$$C = X^T X \in R^{NJ} \quad \text{(Equation 2)}$$

The position of the user 106(1) may then be determined by solving an eigen-values problem, as indicated in Equation 3 below:

$$L^{-1} Cv = \lambda v \quad \text{(Equation 3)}$$

In Equation 3, L represents the second derivative of the original data (X).

For example, FIG. 1 depicts the activity data 102(1) as a signal based on a function that represents the position of the user 106(1) along the Y-axis relative to time, which is represented by the X-axis. Continuing the example, each peak in the resulting signal may represent a time when the position of the body of the user 106(1), determined primarily by analyzing the body parts that have the maximum total amount of movement, deviates by a maximum amount from an average value for the position of the user 106(1). Such a position may constitute a reference position 113(1) within the signal, which may be used to determine performance of the activity by other users 106.

After the activity data 102(1) has been generated based on the video data 104(1), the activity data 102(1) may be stored as a representation of the activity performed by the user 106(1). In some implementations, the computing device(s) 110 may generate output data 114(1) indicative of successful generation of activity data 102(1). The output data 114(1) may be provided to an output device 116(1) to cause presentation of output 112(1) indicative of generation of the activity data 102(1). In some implementations, if insufficient pose data is determined from the video data 104(1) for generation of the activity data 102(1), the output data 114(1) may generate output 112(1) requesting that the user 106(1) continue performing the activity to generate additional video data 104(1), or that the user 106(1) modify a positional relationship between the user 106(1) and camera 108(1).

At a subsequent time, the activity data 102(1) may be used to determine a number of times the activity is performed by another user 106(2). For example, a number of repetitions that a fitness exercise or other activity is performed may be determined by projecting the original signal (X in Equation 1) on the first eigen-vector, corresponding to the largest eigen-value, as indicated in Equation 4 below:

$$z \in R^N \qquad \text{(Equation 4)}$$

Each time that the body of a subsequent user 106(2) reaches a position represented by a peak (e.g., a reference position 113(1)) of the activity data 102(1), or for every two zero-crossings represented by the movement of the subsequent user 106(2), one repetition of the activity represented by the activity data 102(1) may be counted. In some implementations, repetitions of the activity may be counted in real-time. For example, output indicative of a completed repetition of an activity may be presented as the activity is performed by a user 106(2).

For example, at a second time T2, FIG. 1 depicts a second user 106(2) performing the activity associated with the activity data 102(1) within a field of view of a camera 108(2). The camera 108(2) may acquire video data 104(2) representing the performance of the activity by the second user 106(2). One or more computing devices 110 may receive the video data 104(2) from the camera 108(2). In some implementations, the computing device(s) 110 associated with the second user 106(2) may include the same computing device(s) 110 that received the first video data 104(1). For example, a server or group of servers may receive video data 104 from multiple users 106 and compare activity data 102 generated based on the received video data 104 to determine performance of activities by users 106. In other implementations, the computing device(s) 110 associated with the second user 106(2) may include one or more separate and distinct devices from those associated with the first user 106(1). For example, the first user 106(1) and second user 106(2) may each use respective smartphones, personal computing devices, portable computing devices, and so forth.

Based on the video data 104(2) representing performance of the activity by the second user 106(2), the computing device(s) 110 may generate activity data 102(2). The activity data 102(2) associated with the second user 106(2) may be generated using the same processes described with regard to the activity data 102(1) associated with the first user 106(1). For example, FIG. 1 depicts second activity data 102(2) representing the position of the second user 106(2) over time as a signal based on a determined function.

At a third time T3, the activity data 102(2) associated with the second user 106(2) and the activity data 102(1) associated with the first user 106(1) may be used to determine a number of repetitions associated with performance of the activity by the second user 106(2). For example, each time that the activity data 102(2) reaches a peak associated with a maximum deviation from an average position for the second user 106(2), this may represent a reference position 113(2) within the activity data 102(2). The reference position 113(2) may correspond to a reference position 113(1) of the first activity data 102(1) that is associated with a maximum deviation from an average position of the first user 106(1). Therefore, for each peak of the second activity data 102(2) that reaches a position corresponding to a peak of the first activity data 102(1), within a threshold value, a repetition of the activity by the second user 106(2) may be counted. In other implementations, for every two zero-crossings represented by the second activity data 102(2), one repetition of the activity by the second user 106(2) may be counted. Output data 114(2) indicative of performance of the activity by the second user 106(2) may be provided to an output device 116(2) to cause generation of output 112(2). For example, FIG. 1 depicts output 112(2) presented to the second user 106(2) indicative of a count of repetitions associated with the activity. In some implementations, the output 112(2) may include a real-time indication of a repetition of an activity as the repetition is completed. In such a case, the output 112(2) may function as feedback regarding correct or incorrect performance of the activity by the user 106(2). For example, if the poses performed by the user 106(2) are not determined to correspond to the reference position 113(1) of the activity data 102(1), output 112(2) indicating a repetition may not be presented. Conversely, if the user 106(2) correctly performs a repetition of the activity, output 112(2) indicating the repetition may be presented. The presence or absence of output 112(2) indicating performance of a repetition may assist the user 106(2) in determining correct body positions in real-time, as the activity is performed.

Figure 2:
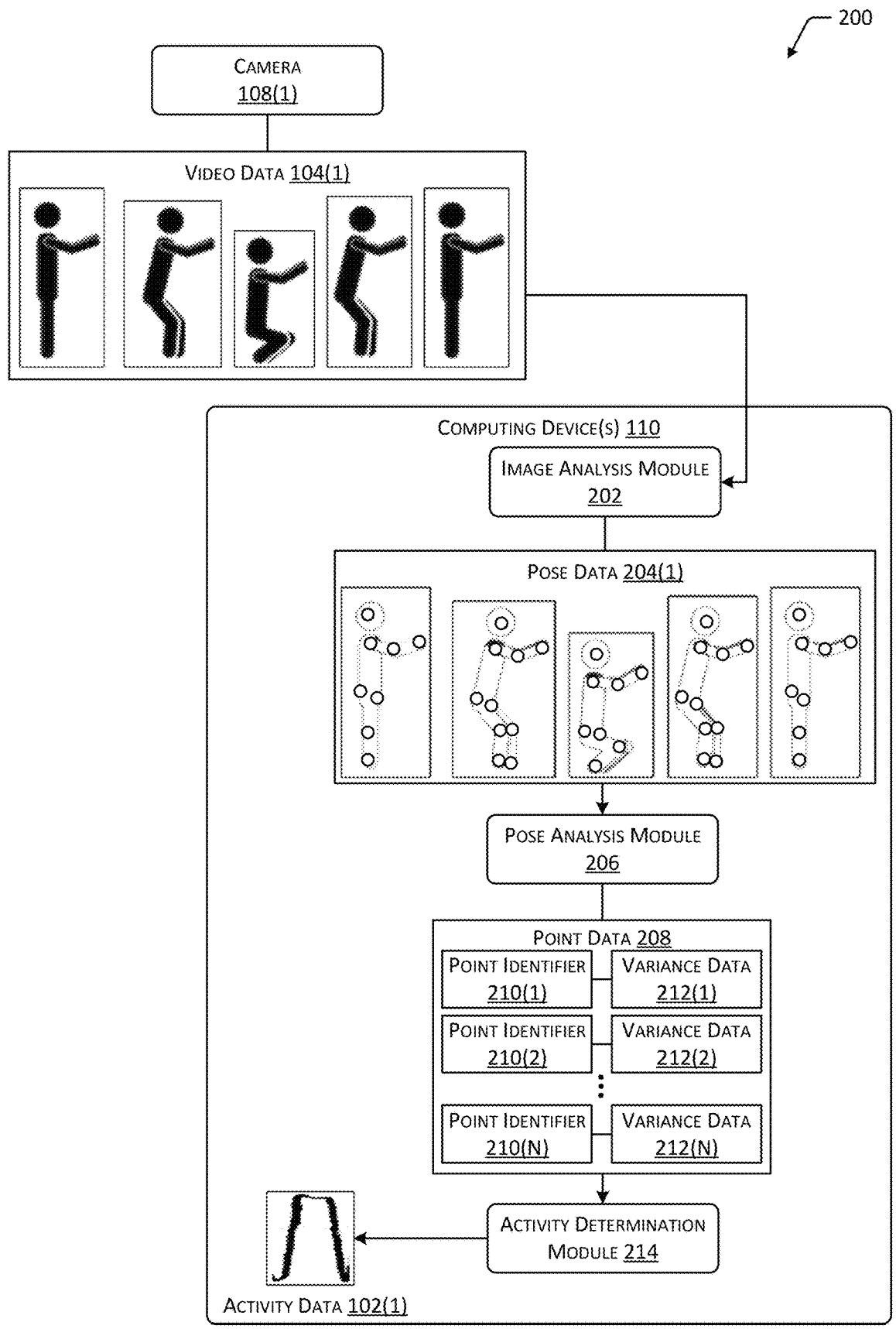
FIG. 2 depicts an implementation of a system for generating activity data based on video data using one or more computing devices.

FIG. 2 depicts an implementation of a system 200 for generating activity data 102(1) based on video data 104(1) using one or more computing devices 110. As described with regard to FIG. 1, one or more cameras 108(1) may acquire video data 104(1) representing performance of an activity by a user 106(1). The video data 104(1) may include one or more frames. For example, FIG. 2 depicts five example frames of video data 104(1) that represent a user 106(1) in various positions during performance of a squatting exercise. An image analysis module 202 associated with the computing device(s) 110 may determine pose data 204(1) representative of the poses of the user 106(1) in at least a subset of the frames of video data 104(1). In some implementations, the image analysis module 202 may include one or more object recognition or segmentation algorithms to identify portions of frames of video data 104(1) in which the user 106(1) is visible. For example, a segmentation algorithm may determine portions of a frame of video data 104(1) associated with a foreground, a background, the user 106(1), one or more other objects, and so forth. An object recognition algorithm may determine portions of a frame of video data 104(1) that correspond to particular body parts of the user 106(1), such as locations of the user's head, elbows, hips, knees, and so forth. As described previously, the determined positions of parts of the user's body may be represented as a set of points. The locations and orientations of one or more points may be constrained by the location of one or more other points based on a set of rules. For example, the location of a point representing a user's foot may be constrained based on the location of a point representing the user's knee, and vice versa. As another example, the location of points representing a user's wrist, shoulder, and elbow may be constrained by a rule indicating a maximum or minimum angle at which the elbow may be positioned.

A pose analysis module 206 associated with the computing device(s) 110 may determine point data 208 based on the pose data 204(1). The point data 208 may associate point identifiers 210 for at least a subset of the points of a pose with variance data 212 indicative of the variance (e.g., movement) of the point within a subset of the frames of video data 104(1). For example, a first point identifier 210(1) may indicate a point associated with a head of a user 106(1), while first variance data 212(1) may indicate a large total variance of the head of the user 106(1). A second point identifier 210(2) may indicate a point associated with a foot of the user 106(1), while second variance data 212(2) may indicate a small total variance of the foot of the user 106(1). The point data 208 may include any number of additional point identifiers 210(N) associated with corresponding variance data 212(N). In some implementations, the variance data 212 for a point may also indicate a local variance associated with the point. Local variance may include an amount of movement associated with the point between consecutive frames of video data 104(1). For example, local variance for a point may be determined based on a second derivative of the position of the point.

An activity determination module 214 associated with the computing device(s) 110 may determine the activity data 102(1) based on the point data 208. In some implementations, the activity data 102(1) may be determined in response to completion of the activity by the user 106(1). For example, user input indicating completion of the activity or a lack of motion by the user may be determined, and the activity data 102(1) may be generated in response to this determination. As described with regard to FIG. 1, the activity data 102(1) may be determined based on an eigen-values problem. Solving the eigen-values problem, such as by using a PCA to optimize for maximum total variance, and in some implementations, minimum local variance, may determine a function represented by the activity data 102(1). In some implementations, the function may be represented by a one-dimensional signal. For example, if the point data 208 indicates a large amount of movement associated with a first body part of the user 106(1) and no movement or a small amount of movement associated with a second body part of the user 106(1), the activity data 102(1) may be more strongly influenced by the positions of the point representing the first body part over time. As shown in FIG. 2, the activity data 102(1) may be represented by a signal based on a function that associates the position of the user 106(1) (e.g., a weighted average position based on a PCA performed on the point data 208) with time. For example, FIG. 2 depicts five example frames of video data 104(1) for which five example poses are determined. In the first and fifth poses, the user 106(1) is shown standing generally upright. In the third pose, the user 106(1) is shown in a squatting position. In the second and fourth poses, the user 106(1) is shown transitioning between upright and squatting positions. The activity data 102(1) representing the position of the user 106(1) is shown as a signal having the shape of a curve with a peak corresponding to the third pose, and low points corresponding to the first and fifth poses. The activity data 102(1) may be stored for subsequent use determining the performance of the activity by the same user 106(1) or other users 106(2). For example, the activity data 102(1) may be used to determine a number of repetitions of an activity that is performed. In some implementations, the activity data 102(1) may also be used to determine correct or incorrect performance of the activity, such as positions of body parts of a user 106(2) that deviate from positions of body parts indicated in the activity data 102(1) or pose data 204(1).

In other implementations, the video data 104(1) may be analyzed and the activity data 102(1) may be determined without determining pose data 204(1) represented by a plurality of points. For example, a segmentation or object recognition algorithm may determine portions of one or more frames of video data 104(1) that represent body parts of a user 106, and movement of the body parts over time, without determining a set of points representative of a pose. Portions within the frames of the video data 104(1) that represent body parts of a user 106(1) exhibiting maximum total variance and minimum local variance over time may then be used to generate the activity data 102(1). Additionally, segmentation or object recognition algorithms may not necessarily identify body parts of a user 106. For example, an algorithm may identify clothing worn by a user 106(1), objects held or carried by the user 106, background objects, and so forth. As another example, an algorithm may determine moving objects within one or more frames of video data 104(1), and based on the assumption that the background within the video data 104(1) includes stationary objects, the moving objects may be assumed to represent the user 106(1). In such a case, the activity data 102(1) may be generated without performing object recognition to identify the moving objects.

Figure 3:
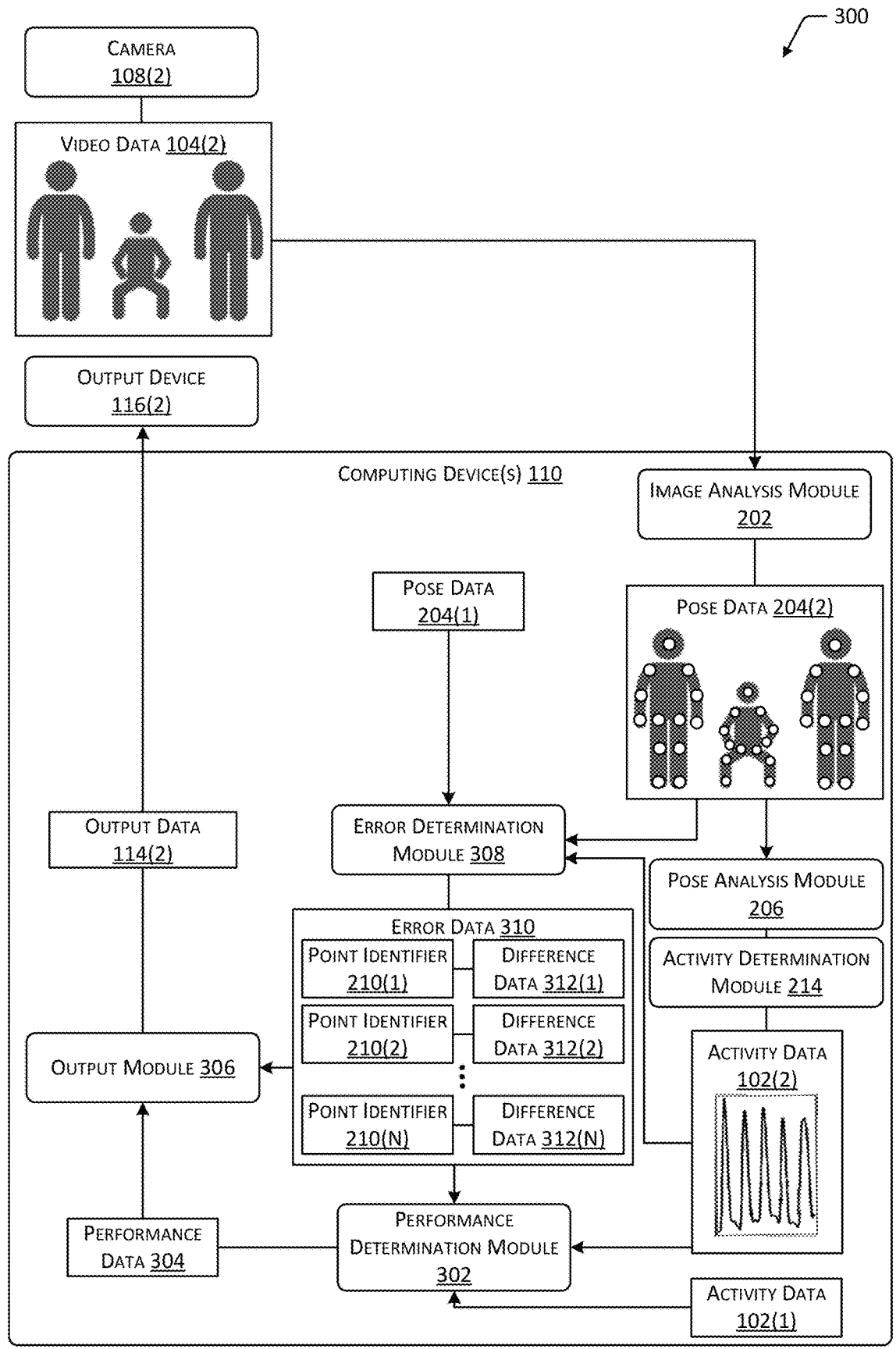
FIG. 3 depicts an implementation of a system for determining performance of an activity based on stored activity data.

FIG. 3 depicts an implementation of a system 300 for determining performance of an activity based on stored activity data 102(1). As described with regard to FIG. 1, when a user 106(2) attempts to perform an activity associated with stored activity data 102(1), one or more cameras 108(2) may acquire video data 104(2) representing the performance of the activity by the user 106(2). One or more computing devices 110 may receive the video data 104(2) from the camera 108(2). In some implementations, the same computing device(s) 110 used with regard to FIG. 2 may also be used to receive the video data 104(2) from the camera 108(2). In other implementations, one or more different computing device(s) 110 may be used. For example, a computing device 110 in an environment with the second user 106(2) may receive the activity data 102(1) associated with performance of the activity by the first user 106(1) and use the activity data 102(1) to determine a number of times the activity is performed by the second user 106(2).

An image analysis module 202 associated with the computing device(s) 110 may generate pose data 204(2) based on the video data 104(2). For example, FIG. 3 depicts the video data 104(2) with three example frames. In the first and third frames, the user 106(2) is shown in a generally upright position. In the second frame, the user 106(2) is shown in a squatting position. The pose data 204(2) illustrates three example poses of the user 106(2), each corresponding to a frame of the video data 104(2). Each pose may be represented by a plurality of points, each point representing the position of a body part of the user 106(2).

A pose analysis module 206 may generate point data 208 (not shown) based on the pose data 204(2), and an activity determination module 214 may generate activity data 102(2)

based on the point data 208. For example, as described with regard to FIG. 2, solving an eigen-values problem to optimize for maximum total variance and minimum local variance may be used to generate activity data 102(2) that represents a weighted average position of the user 106(2) over time. The activity data 102(2) may be represented as a function that is more significantly influenced by the points of the pose data 204(2) having the largest amount of movement over time. For example, FIG. 3 depicts the activity data 102(2) represented by a signal having multiple peaks that correspond to times when the user 106(2) is in a squatting position and low points that correspond to times when the user 106(2) is in an upright position.

A performance determination module 302 associated with the computing device(s) 110 may generate performance data 304 based at least in part on the activity data 102(2). For example, the performance determination module 302 may access activity data 102(1) determined based on the initial video data 104(1) acquired from the first user 106(1), such as the activity data 102(1) determined in FIG. 2. The activity data 102(1) may include an indication of an average position value (which may function as a zero-crossing value), an indication of one or more minimum or maximum values (e.g., a reference position 113(1)) that deviate from the average position value, and so forth. In some implementations, the performance determination module 302 may determine the average position value or the minimum or maximum values based on the activity data 102(1). The performance determination module 302 may also access the activity data 102(2) based on performance of the activity by the second user 106(2). The performance determination module 302 may compare the second activity data 102(2) to the first activity data 102(1) to determine minimum or maximum values for the second activity data 102(2) that correspond to those of the first activity data 102(1), zero-crossing events for the second activity data 102(2) based on the average position value of the first activity data 102(1), or combinations thereof. For example, each peak in the signal represented by the second activity data 102(2) may correspond to a completed repetition of an activity represented by a peak in the signal of the first activity data 102(1). The performance data 304 may include a count of repetitions of the activity, determined based on comparing the second activity data 102(2) to the first activity data 102(1).

An output module 306 associated with the computing device(s) 110 may generate output data 114(2) based on the performance data 304. For example, as shown in FIG. 1, output 112(2) based on the output data 114(2) may indicate a count of repetitions of the activity that was performed by the second user 106(2).

In some implementations, an error determination module 308 associated with the computing device 110 may generate error data 310 indicative of one or more errors in the performance of the activity by the user 106(2). The error determination module 308 may access pose data 204(1) determined based on the initial video data 104(1) acquired from the first user 106(1), such as the pose data 204(1) determined in FIG. 2. In some implementations, the error determination module 308 may access the activity data 102(1), determined based on the pose data 204(1) in addition to or in place of the pose data 204(1). In other implementations, the error determination module 308 may determine activity data 102 based on the pose data 204(1). In some implementations, the activity data 102(1) determined by the error determination module 308 may be identical to the activity data 102(1) determined by the activity determination module 214. In other implementations, the error determination module 308 may determine different activity data 102. For example, determining the presence of errors (e.g., differences in positions between the poses of the second user 106(2) and those of the first user 106(1)) may include optimizing the points represented by pose data 204 differently than when optimizing to determine maximum total variance and minimum local variance. The error determination module 308 may also access the pose data 204(2) determined based on the video data 104(2) associated with the second user 106(2), the activity data 102(2) determined based on the pose data 204(2), or both the activity data 102(2) and the pose data 204(2). By comparing the locations of points associated with the pose data 204(2) of the second user 106(2) with the locations of corresponding points of corresponding poses for the pose data 204(1) of the first user 106(1), one or more differences between the positions of body parts for the second user 106(2) may be determined. Additionally, by comparing the signal represented by the second activity data 102(2) with that represented by the first activity data 102(1) differences in the shape or other characteristics of the signals may indicate differences in the poses performed by the users 106. For example, if a point representing a maximum deviation from an average position of the second user 106(2) does not reach a similar deviation represented in the activity data 102(1) for the first user 106(1), this may indicate that the second user 106(2) has not achieved the same pose as the first user 106(1). The error data 310 may associate point identifiers 210 for one or more points of one or more poses with difference data 312 indicative of a difference between the position of a particular point for the second user 106(2) and the corresponding point for the first user 106(1). For example, FIG. 3 depicts the error data 310 associating a first point identifier 210(1) with first difference data 312(1), a second point identifier 210(2) with second difference data 312(2), and any number of additional point identifiers 210(N) with corresponding difference data 312(N). The error data 310 may be provided to the output module 306, which may generate the output data 114(2) based in part on the error data 310. For example, output 112(2) based on the output data 114(2) may indicate one or more differences between a position of the second user 106(2) and a position of the first user 106(1) that may represent an error in performance of the activity.

Figure 4:
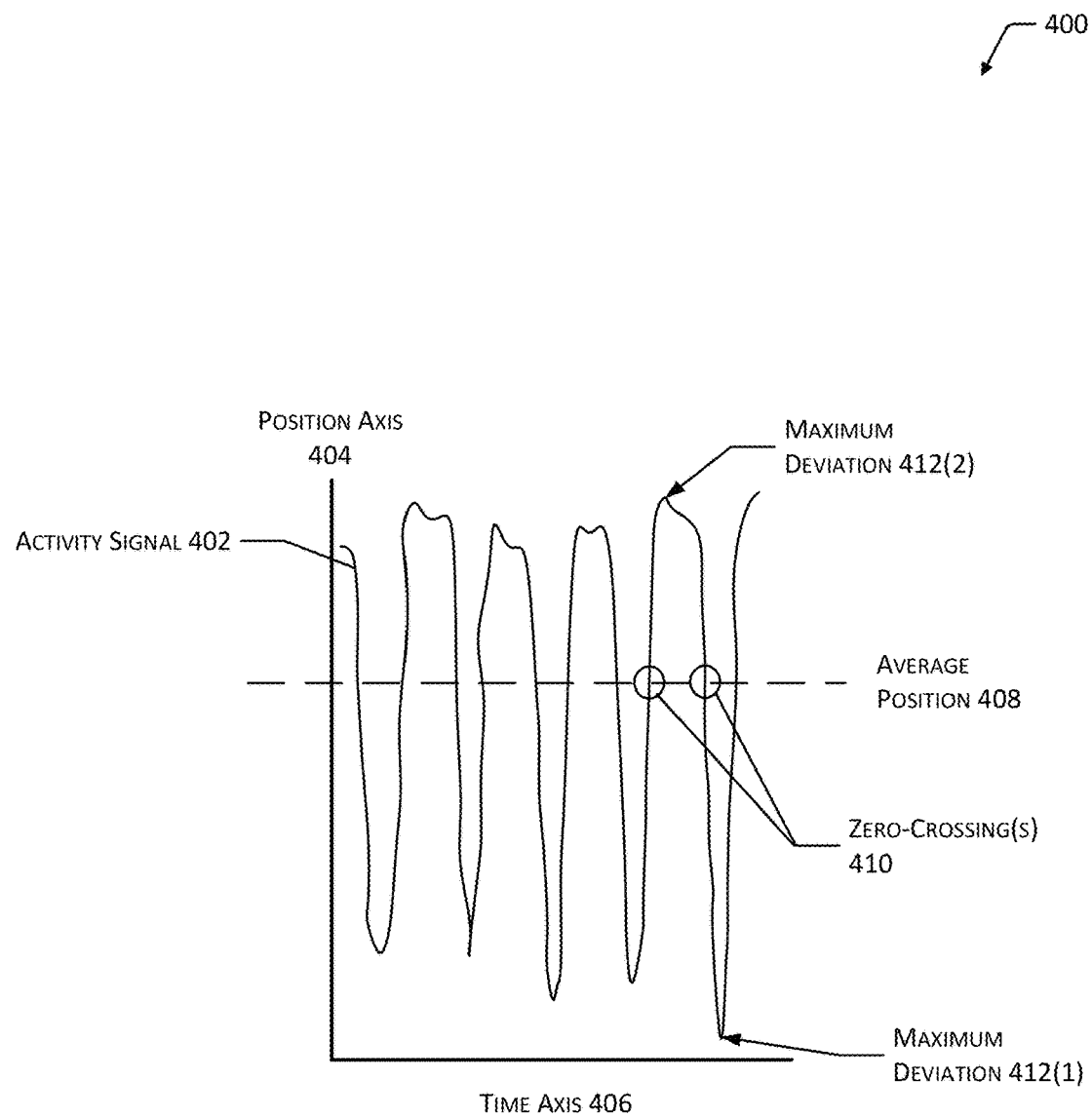
FIG. 4 is a diagram depicting an implementation of activity data generated based on acquired video data.

FIG. 4 is a diagram 400 depicting an implementation of activity data 102(1) generated based on acquired video data 104(1). Other activity data 102(2) generated based on other video data 104(2) may be represented similarly. As described with regard to FIGS. 1-3, the activity data 102(1) may be represented by an activity signal 402 that associates a weighted average position of a user 106(1), determined based on variance in the locations of points representing body parts of the user 106(1), with the times that various positions occur. For example, the activity signal 402 is shown within a graph having a position axis 404 and a time axis 406. The position of the activity signal 402 along the position axis 404 may represent a deviation of the position of the user 106(1) from an average position 408 at a time corresponding to the position of the activity signal 402 along the time axis 406. The average position 408 may be used to normalize the positions of the points representing the poses of the user 106(1). For example, the data may be normalized by setting the mean to equal zero. As a result, points at which the activity signal 402 intersects the average position 408 may constitute a zero-crossing 410. As described previously, zero-crossing 410, or in some cases, two zero-crossings 410 may represent a completed repetition of an activity. For example, FIG. 4 depicts an example portion of an activity signal 402 having four curves, each curve representing performance of a repetition of the action. Each curve has two low points, representing a point of maximum deviation 412(1) from the average position 408 in a first direction, and one peak, representing a point of maximum deviation 412(2) from the average position 408 in a second direction. Each curve intersects the average position 408 at two locations. Therefore, each peak, or each set of two zero crossings 410 may represent one repetition of the activity.

Figure 5:
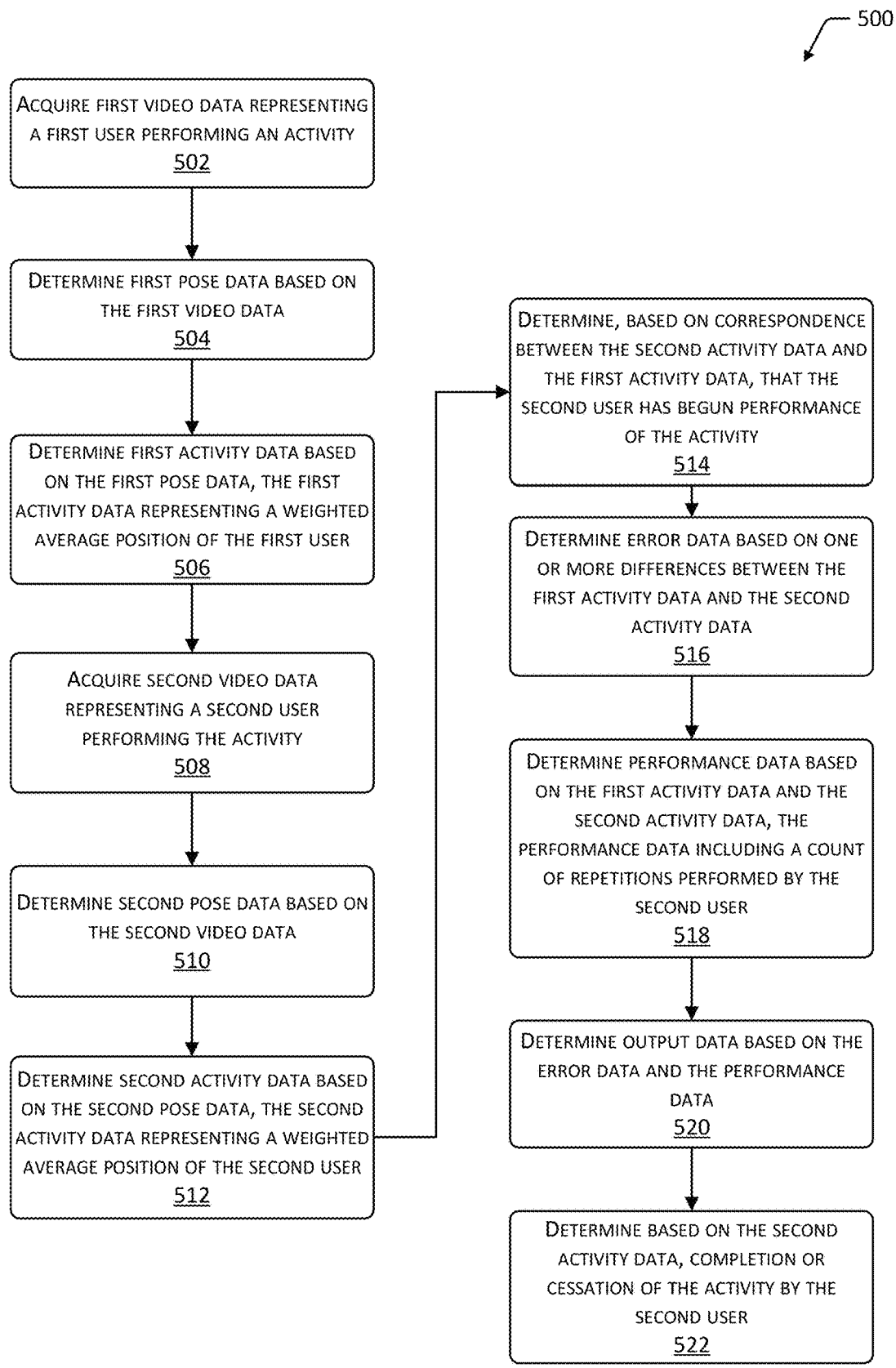
FIG. 5 is a flow diagram illustrating an implementation of a method for determining errors and a count of repetitions of an activity for a second user based on stored activity data generated by a first user.

FIG. 5 is a flow diagram 500 illustrating an implementation of a method for determining errors and a count of repetitions of an activity for a second user 106(2) based on stored activity data 102(1) generated by a first user 106(1). At 502, first video data 104(1) representing a first user 106(1) performing an activity may be acquired. As described with regard to FIG. 1, a first user 106(1) may be positioned within a field of view of a camera 108(1) and may perform one or more repetitions of the activity. The camera 108(1) may acquire video data 104(1) which may be analyzed to determine characteristics of the activity performed by the first user 106(1).

At 504, first pose data 204(1) may be determined based on the first video data 104(1). As described with regard to FIG. 2, pose data 204(1) may represent poses of the first user 106(1) in at least a subset of the frames of video data 104(1). A pose may be represented by a plurality of points, each point corresponding to a location and orientation of a body part of the first user 106(1). The locations and orientations of one or more points may be constrained by the locations and orientations of one or more other points based on a set of rules. Additionally, the determined locations and orientations of one or more of the points may be a location within a frame of video data 104(1), such as a coordinate location, or a location relative to another point, such as a distance and direction relative to a point representing a different body part of a user 106(1).

At 506, first activity data 102(1) may be determined based on the first pose data 204(1). As described with regard to FIG. 2, the pose data 204(1) may be analyzed to determine point data 208 indicative of the variance of at least a subset of the points representing the body parts of the first user 106(1) over time. For example, a first body part of the first user 106(1) may move a large distance during a repetition of the activity, a second body part may move a small distance, and a third body part may remain generally stationary. Generation of the activity data 102(1) may include solving an eigen-values problem or other type of mathematical function to generate a function representative of an activity signal 402 or other type of one-dimensional or multi-dimensional signal. For example, an activity signal 402 may represent a weighted average position of the first user 106(1) over time. Determination of the activity data 102(1) may include optimizing the points of the pose data 204(1) for maximum total variance, and in some implementations, for minimum local variance, which may associate a greater weight, priority, or importance with the locations of points based on the amount of movement of the body part represented by each point. As described with regard to FIG. 4, the activity signal 402 represented by the activity data 102(1) may include an average position 408 and one or more points of maximum deviation 412 from the average position.

At 508, second video data 104(2) representing a second user 106(2) performing the activity may be acquired. For example, a second user 106(2) may attempt to perform the activity represented by the activity data 102(1) generated by the first user 106(1). The second user 106(2) may be positioned within a field of view of a camera 108(2), which may generate the video data 104(2). The video data 104(2) may be analyzed to determine characteristics of the activity performed by the second user 106(2).

At 510, second pose data 204(2) may be determined based on the second video data 104(2). The second pose data 204(2) may represent poses achieved by the second user 106(2) in at least a subset of the frames of the second video data 104(2). Each pose of the second pose data 204(2) may be represented by a plurality of points, each point representing the location and orientation of a body part of the second user 106(2).

At 512, second activity data 102(2) may be determined based on the second pose data 204(2). The second activity data 102(2) may represent a weighted average position of the second user 106(2). The second activity data 102(2) may be determined in a similar manner as the first activity data 102(1). For example, an eigen-values problem or another type of mathematical function may be performed that associates a greater priority with points associated with a larger amount of total variance than with points associated with a small amount of total variance.

At 514, based on correspondence between the second activity data 102(2) and the first activity data 102(1), it may be determined that the second user 102(2) has begun performance of the activity. For example, the second user 102(2) may enter the field of view of a camera 108(2) at a first time, but may not necessarily begin performing the activity represented by the first activity data 102(1) until a second time after the first time. In some implementations, the second user 106(2) may provide user input to indicate an intention to perform the activity. In other implementations, the second user 106(2) may begin to perform the activity within the field of view of the camera 108(2) without providing such an indication. In such a case, if the second activity data 102(2) corresponds to the first activity data 102(1) within a threshold tolerance, this may indicate that the second user 106(2) has begun to perform the activity.

At 516, error data 310 may be determined based on one or more differences between the first activity data 102(1) and the second activity data 102(2). For example, differences in the shape of an activity signal 402 for the second activity data 102(2) and that of the first activity data 102(1) may indicate a difference in a pose performed by the second user 102(2). In other implementations, the error data 310 may be determined based on the first pose data 204(1) and the second pose data 204(2). For example, differences between the location of a point associated with the second pose data 204(2) and a corresponding point of the first pose data 204(1) may indicate a possible error in the performance of the activity by the second user 106(2), such as an incorrect position of a body part represented by the point. In some implementations, data indicative of the potential error may be presented to the second user 106(2) as output 112(2).

At 518, performance data 304 may be determined based on the first activity data 102(1) and the second activity data 102(2). The performance data 304 may include a count of repetitions of the activity performed by the second user 106(2). For example, the first activity data 102(1) may include an average position 408, which may be used to determine zero-crossings 410, and one or more points of maximum deviation 412. The second activity data 102(2) may be represented by an activity signal 402 that intersects the average position 408 associated with the first activity data 102(1) and that may include peaks and low points that correspond to the locations of points of maximum deviation 412 in the first activity data 102(1). For example, each peak in the activity signal 402 of the second activity data 102(2)

may correspond to a completed repetition of an activity represented by a point of maximum deviation 412 in the activity signal 402 of the first activity data 102(1). As another example, each set of two instances that the activity signal 402 of the second activity data 102(2) intersects the average position 408 of the activity signal 402 represented by the first activity data 102(1) may correspond to a completed repetition of the activity.

At 520, output data 114(2) may be determined based on the error data 310 and the performance data 304. For example, the output data 114(2) may cause an output device 116(2) to present output 112(2) that includes information regarding one or more potential errors, such as a difference between the position of a body part of the second user 106(2) and a position of the corresponding body part of the first user 106(1). The output 112(2) may also include an indication of the count of repetitions of the performance data 304. In some implementations, the output data 114(2) may include other characteristics of the activity performed by the second user 106(2). For example, an amount of calories (e.g., energy) used by the second user 106(2) during performance of the activity may be determined based in part on the rate at which the activity is performed, which may be determined using the derivative of the position of the second user 106(2), or the acceleration of the second user 106(2), which may be determined using the second derivative. In some implementations, the output data 114(2) may be provided to an output device 116(2) to cause presentation of output 112(2) in real-time, such as during performance of the activity by the second user 106(2).

At 522, based on the second activity data 102(2) completion or cessation of the activity by the second user 106(2) may be determined. For example, if the second activity data 102(2) corresponds to a portion of the first activity data 102(1) that represents completion of the activity, this may indicate that the second user 106(2) has completed performance of the activity. As another example, if the second activity data 102(2) indicates that the second user 106(2) has ceased movement or that the movement of the second user 106(2) deviates from the first activity data 102(1) to an extent that indicates that the second user 106(2) is no longer performing the activity, this may indicate that the second user 106(2) has ceased performance of the activity. In some implementations, after determining completion or cessation of the activity, additional output data 114(2) may be generated based on error data 310 and performance data 304. For example, a summary of one or more characteristics of the activity performed by the second user 106(2) may be presented.

Figure 6:
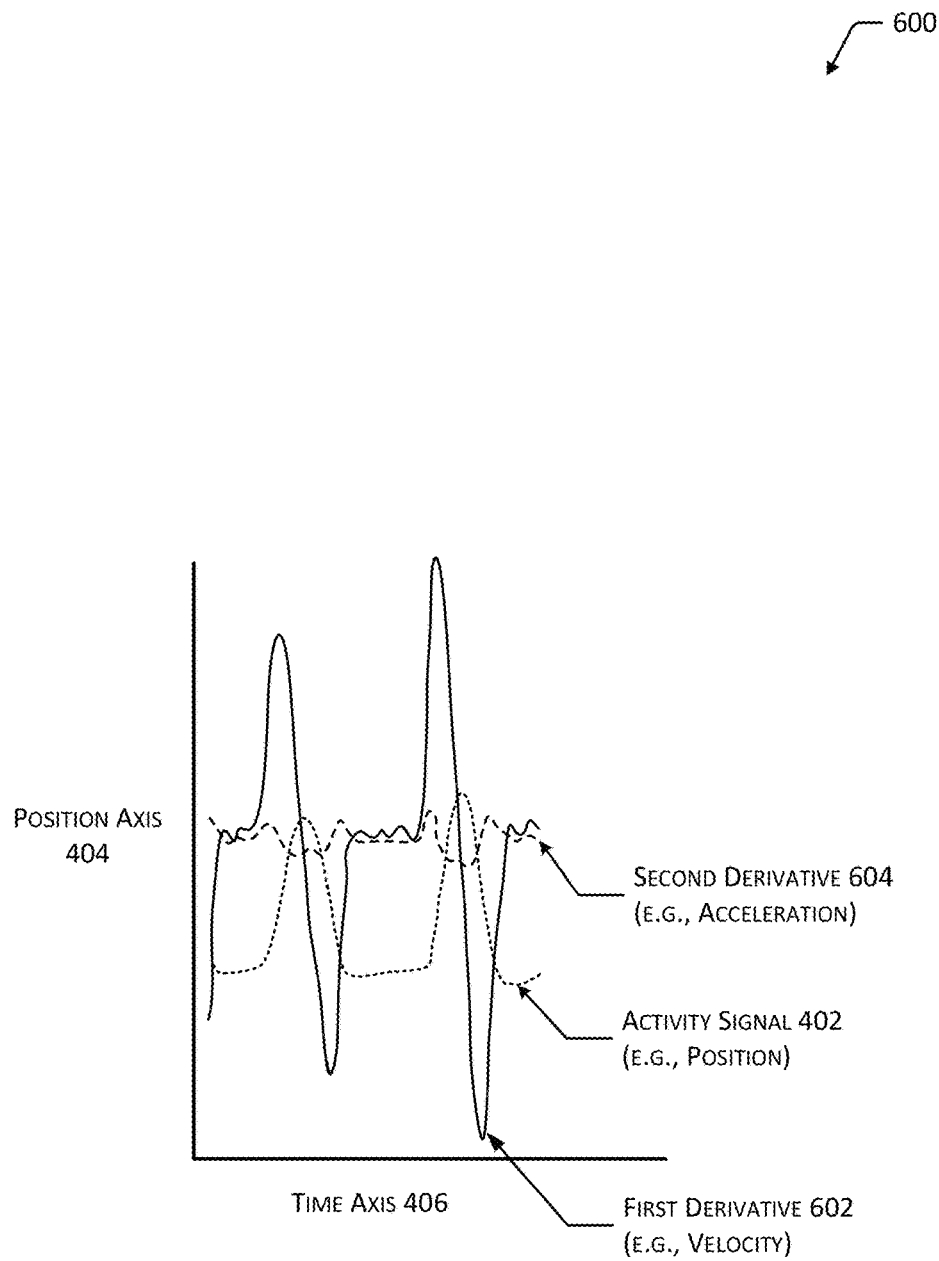
FIG. 6 depicts a diagram showing an example implementation of activity data.

FIG. 6 depicts a diagram 600 showing an example implementation of activity data 102(2). In the activity data 102(2) of FIG. 6, an activity signal 402 represents a weighted average position of a user 106(2) over time. For example, each peak and low point of the activity signal 402 may represent a point of maximum deviation 412 of the position of the user 106(2) from an average position 408. Because the activity data 102(2) associates the position of the user 106(2) with time, a first derivative 602 of the activity signal 402 may represent the rate of change of the position (e.g., the velocity) of the user 106(2). A second derivative 604 of the activity signal 402 may represent a rate of change of the velocity (e.g., the acceleration) of the user 106(2). In some implementations, one or more of the velocity or the acceleration of the user 106(2) may be used to determine an amount of calories used in performance of the activity. For example, a faster rate of movement of a user 106(2) may use a greater number of calories than a slower rate of movement.

Additionally, in some implementations, the second derivative 604 may be used when optimizing a mathematical function, such as PCA, for minimum local variance. For example, an activity signal 402 having a smaller second derivative 604 may result in a smoother signal with less local variance. Continuing the example, points of a pose of a user 106 for which a second derivative 604 has a smaller value may be less affected by inaccuracy.

In some implementations, the methods described herein for generation of activity data 102 based on video data 104 may be performed using existing video data 104 rather than video data 104 acquired from a user 106 within a field of view of a camera 108. For example, an existing data store or other source of video data 104 may be accessed, and activity data 102 may be generated for at least a portion of the stored video data 104. Based on the activity signal 402, which may represent the position of a user 106 performing activities within the stored video data 104, a range of movement relative to an average position 408 may be determined. Based on the first derivative 602, a speed of the activity may be determined, which may represent an intensity or difficulty of a fitness exercise or other type of activity, an amount of calories associated with performance of the activity, and so forth. For example, a user 106 may search a body of video data 104 using filters, queries, or sorting algorithms based on the first derivative 602 of the activity signal 402, which may represent a speed at which the activity is performed.

Figure 7:
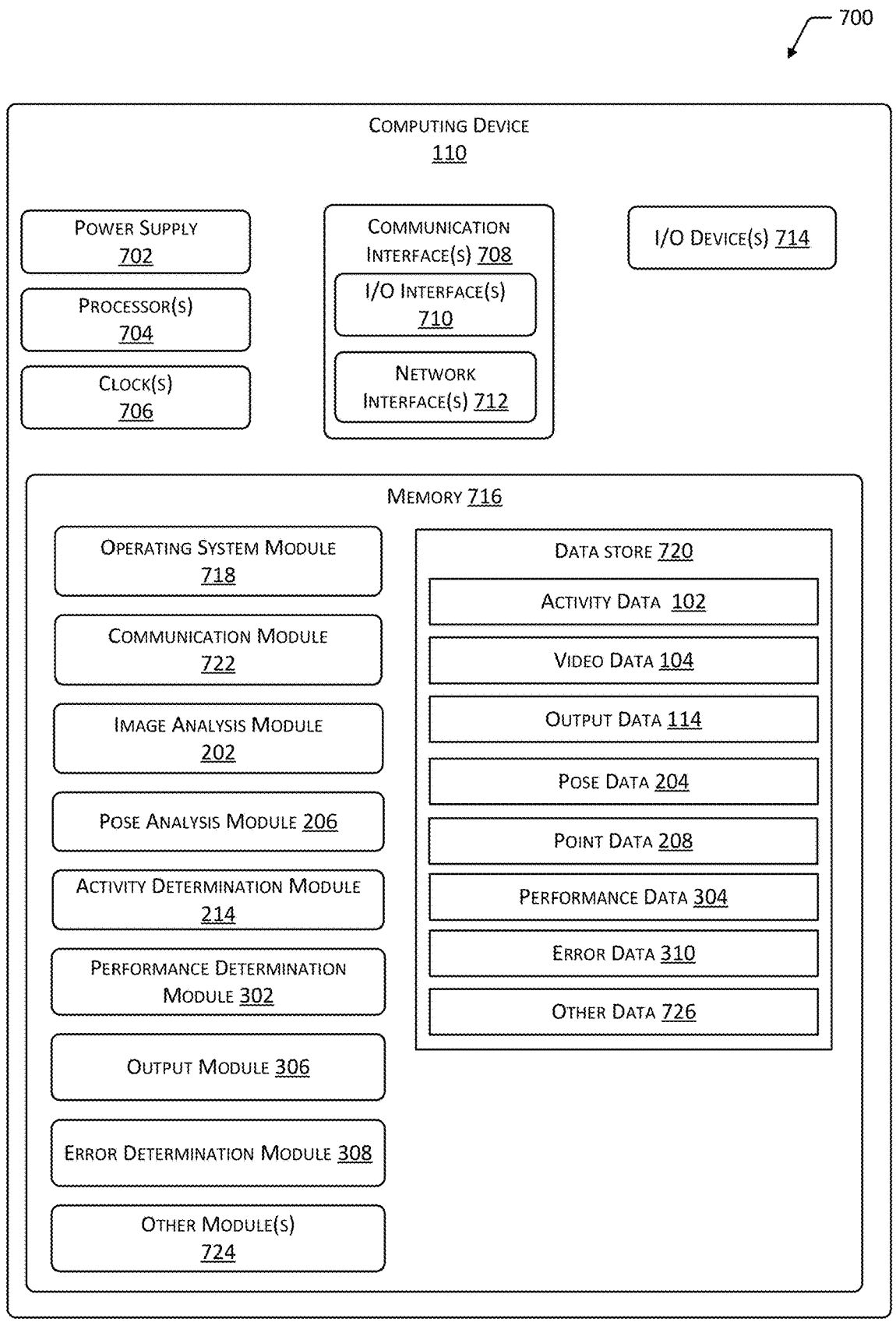
FIG. 7 is a block diagram illustrating an implementation of a computing device within the present disclosure.

FIG. 7 is a block diagram 700 of a computing device 110 within the present disclosure. The computing device 110 may include a server, a computing device 110 having an integrated camera 108, such as a smartphone, or any other personal computing device, mobile computing device, portable computing device, and so forth. Additionally, while FIG. 7 depicts a single block diagram 700 of a computing device 110, any number and any type of computing devices 110 may be used to perform the functions described herein.

One or more power supplies 702 may be configured to provide electrical power suitable for operating the components of the computing device 110. In some implementations, the power supply 702 may include a rechargeable battery, fuel cell, photovoltaic cell, power conditioning circuitry, and so forth.

The computing device 110 may include one or more hardware processor(s) 704 (processors) configured to execute one or more stored instructions. The processor(s) 704 may include one or more cores. One or more clock(s) 706 may provide information indicative of date, time, ticks, and so forth. For example, the processor(s) 704 may use data from the clock 706 to generate a timestamp, trigger a preprogrammed action, and so forth.

The computing device 110 may include one or more communication interfaces 708, such as input/output (I/O) interfaces 710, network interfaces 712, and so forth. The communication interfaces 708 may enable the computing device 110, or components of the computing device 110, to communicate with other computing devices 110 or components of the other computing devices 110. The I/O interfaces 710 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 710 may couple to one or more I/O devices 714. The I/O devices 714 may include any manner of input devices or output devices associated with the computing device 110. For example, I/O devices 714 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 714 may be physically incorporated with the computing device 110. In other implementations, I/O devices 714 may be externally placed.

The network interfaces 712 may be configured to provide communications between the computing device 110 and other devices, such as the I/O devices 714, routers, access points, and so forth. The network interfaces 712 may include devices configured to couple to one or more networks including local area networks (LANs), wireless LANs (WLANs), wide area networks (WANs), wireless WANs, and so forth. For example, the network interfaces 712 may include devices compatible with Ethernet, Wi-Fi, Bluetooth, ZigBee, Z-Wave, 3G, 4G, 5G, LTE, and so forth.

The computing device 110 may include one or more busses or other internal communications hardware or software that allows for the transfer of data between the various modules and components of the computing device 110.

As shown in FIG. 7, the computing device 110 may include one or more memories 716. The memory 716 may include one or more computer-readable storage media (CRSM). The CRSM may be any one or more of an electronic storage medium, a magnetic storage medium, an optical storage medium, a quantum storage medium, a mechanical computer storage medium, and so forth. The memory 716 may provide storage of computer-readable instructions, data structures, program modules, and other data for the operation of the computing device 702. A few example modules are shown stored in the memory 716, although the same functionality may alternatively be implemented in hardware, firmware, or as a system on a chip (SoC).

The memory 716 may include one or more operating system (OS) modules 718. The OS module 718 may be configured to manage hardware resource devices such as the I/O interfaces 710, the network interfaces 712, the I/O devices 714, and to provide various services to applications or modules executing on the processors 704. The OS module 718 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 720 and one or more of the following modules may also be associated with the memory 716. The modules may be executed as foreground applications, background tasks, daemons, and so forth. The data store(s) 720 may use a flat file, database, linked list, tree, executable code, script, or other data structure to store information. In some implementations, the data store(s) 720 or a portion of the data store(s) 720 may be distributed across one or more other devices including other computing devices 110, network attached storage devices, and so forth.

A communication module 722 may be configured to establish communications with one or more other computing devices 110. Communications may be authenticated, encrypted, and so forth.

The memory 716 may also store the image analysis module 202. The image analysis module 202 may determine pose data 204 representative of the poses of a user 106 based on one or more frames of video data 104. The image analysis module 202 may include one or more object recognition or segmentation algorithms to identify portions of frames of video data 104 that include a user 106. For example, a segmentation algorithm may determine portions of a frame of video data 104 associated with a foreground, a background, a user 106, one or more other objects, and so forth. An object recognition algorithm may determine portions of a frame of video data 104 that correspond to particular body parts of a user 106. The determined positions of parts of the user's body may be represented as a set of points. The image analysis module may access one or more rules or other data indicative of constraints regarding the locations and orientations of one or more points relative to one or more other points.

The memory 716 may additionally store the pose analysis module 206. The pose analysis module 206 may determine point data 208 based on pose data 204. Point data 208 may associate point identifiers 210 for one or more points of a pose with variance data 212 indicative of the variance (e.g., movement) of the point within a subset of the frames of video data 104. The point data 208 may be used to determine a total variance and a local variance of one or more points representative of body parts of a user 106.

The memory 716 may store the activity determination module 214. The activity determination module 214 may determine activity data 102 based on one or more of pose data 204 or point data 208 determined based on video data 104. In some implementations, the activity determination module 214 may solve an eigen-values problem that optimizes for maximum total variance, and in some implementations, minimum local variance, to generate activity data 102 which may be represented by an activity signal 402. The resulting activity signal 402 may represent an average weighted position of a user 106 over time. Activity data 102 may be stored for subsequent use determining the performance of the activity by users 106. For example, the activity data 102 may be used to determine a number of repetitions of an activity that is performed. In some implementations, the activity data 102 may also be used to determine correct or incorrect performance of the activity, such as positions of body parts of a user 106 that deviate from positions of body parts indicated in the activity data 102 or pose data 204.

The memory 716 may also store the performance determination module 302. The performance determination module 302 may generate performance data 304 based on activity data 102. For example, the performance determination module 302 may compare stored activity data 102 with activity data 102 determined from a user 106 performing an activity corresponding to the stored activity data 102. The performance data 304 may include a count of repetitions for performance of an activity. For example, activity data 102 may include an indication of an average position 408 and one or more points of maximum deviation 412 from the average position 408. In some implementations, the performance determination module 302 may determine the average position 408 and the points of maximum deviation 412. The performance determination module 302 may determine minimum or maximum values for activity data 102 determined from a user 106 that correspond to those of the stored activity data 102. In other implementations, the performance determination module 302 may determine zero-crossing events in which an activity signal 402 represented by the activity data 102 determined from a user 106 intersects an average position 408 for stored activity data 102.

The memory 716 may additionally store the output module 306. The output module 306 may generate output data 114 based on performance data 304. For example, output 112 based on the output data 114 may indicate a count of repetitions of an activity indicated in the performance data 304. In some implementations, the output data 114 may also be based on error data 310 determined using the error determination module 308.

The memory 716 may store the error determination module 308, which may generate error data 310 indicative of one or more errors in performance of an activity by a user 106. In some implementations, the error determination module 308 may access pose data 204 determined based on different video data 104 and determine a difference between the locations of corresponding points within the video data 104. In other implementations, the error determination module 308 may access activity data 102 determined based on different video data 104 and determine differences in the activity signals 402 represented by the activity data 102. Differences in the activity signals 402 may indicate a difference in the position of a body of a second user 106(2) relative to the position of the body of a first user 106(1). The error data 310 may associate point identifiers 210 for one or more points of one or more poses with difference data 312 indicative of a difference between the position of a particular point for first video data 104 and a corresponding point for second video data 104. The error data 310 may be provided to the output module 306, which may generate the output data 114 based in part on the error data 310.

Other modules 724 may also be present in the memory 716. For example, other modules 724 may include permission or authorization modules to enable a user 106 to provide authorization to acquire video data 104 of the user 106. Other modules 724 may also include encryption modules to encrypt and decrypt communications between computing devices 110, authentication modules to authenticate communications sent or received by computing devices 110, a permission module to assign, determine, and manage user permissions to access or modify data associated with computing devices 110, user interface modules to generate interfaces for receiving input from users 106, and so forth.

Other data 726 within the data store(s) 720 may include configurations, settings, preferences, and default values associated with computing devices 110. Other data 726 may also include encryption keys and schema, access credentials, and so forth. Other data 726 may additionally include audio files for output, such as during performance of activities by a user 106.

In different implementations, different computing devices 110 may have different capabilities or capacities. For example, servers may have greater processing capabilities or data storage capacity than smartphones or other portable computing devices 110.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
acquire first video data representing a first user performing an activity;
determine, based on the first video data, a first pose of the first user at a first time, wherein the first pose includes a first plurality of points, each point of the first plurality of points representing a first location of a body part of the first user;
determine, based on the first video data, a second pose of the first user at a second time, wherein the second pose includes a second plurality of points, each point of the second plurality of points representing a second location of a body part of the first user;
determine a first subset of the first plurality of points for which a first difference between the first location and the second location represents a first total variance;
based on the first subset of the first plurality of points, the first pose, and the second pose, generate first data representative of a first position of the first user at the first time and a second position of the first user at the second time;

determine a first portion of the first data that is representative of a maximum deviation from an average position; and
store the first data.

2. The system of claim 1, further comprising computer-executable instructions to:
acquire second video data representing a second user performing the activity;
determine, based on the second video data, a third pose of the second user at a third time, wherein the third pose includes a third plurality of points, each point of the third plurality of points representing a third location of a body part of the second user;
determine, based on the second video data, a fourth pose of the second user at a fourth time, wherein the fourth pose includes a fourth plurality of points, each point of the fourth plurality of points representing a fourth location of a body part of the second user;
determine, a second subset of the third plurality of points for which a second difference between the third location and the fourth location represents a second total variance;
based on the second subset, the third pose, and the fourth pose, generate second data representative of a third position of the second user at the third time and a fourth position of the second user at the fourth time;
determine a second portion of the second data that corresponds to the first portion of the first data; and
based on the correspondence between the second portion and the first portion, determine performance of the activity by the second user.

3. The system of claim 2, further comprising computer-executable instructions to:
determine a third difference between a fifth location of a first point of the third plurality of points and a sixth location of a second point of the first plurality of points;
determine the body part of the second user associated with the first point; and
determine output indicative of the body part and the third difference.

4. A method comprising:
accessing first video data representing a first user performing an activity;
determining, based on the first video data, a first location of a first body part of the first user at a first time;
determining, based on the first video data, a second location of the first body part at a second time;
determining, based on the first video data, a third location of a second body part of the first user at the first time;
determining, based on the first video data, a fourth location of the second body part at the second time;
determining a first difference between the first location and the second location;
determining a second difference between the third location and the fourth location;
determining that the first difference is greater than the second difference; and
based on the first difference being greater than the second difference, determining first data indicative of a first position of the first user at the first time and a second position of the first user at the second time, wherein the first data is based on the first location and the second location.

5. The method of claim 4, further comprising:
associating a first value with the first location and the second location, wherein the first value is based on the first difference; and
associating a second value with the third location and the fourth location, wherein the second value is based on the second difference, the second difference is less than the first difference, and the first value is associated with a greater priority than the second value;
wherein the first data is further based on the first value, the second value, the third location, and the fourth location.

6. The method of claim 4, further comprising:
determining, based on the first video data, a fifth location of the first body part at a third time;
determining that the fifth location is within a threshold distance of the first location; and
determining completion of the activity based on the fifth location being within the threshold distance of the first location.

7. The method of claim 4, further comprising:
determining completion of the activity based on one or more of:
a lack of movement of the first user for a threshold length of time; or
user input indicating completion of the activity;
wherein the first data is generated in response to the completion of the activity.

8. The method of claim 4, further comprising:
determining an average position based on the first data;
determining that the second position represents a greater deviation from the average position than the first position;
accessing second video data representing a second user performing the activity;
determining, based on the second video data, a first pose of the second user at a third time and a second pose of the second user at a fourth time;
determining that the second pose of the second user corresponds to the second position of the first data; and
based on correspondence between the second pose and the second position, determining performance of the activity by the second user.

9. The method of claim 4, further comprising:
accessing second video data representing a second user performing the activity;
determining, based on the second video data, a fifth location of a third body part of the second user, wherein the third body part corresponds to the first body part of the first user;
determining a third difference between the first location and the fifth location; and
determining output indicative of the third difference.

10. The method of claim 9, further comprising:
associating a first value with the first body part, wherein the first value is based on the first difference; and
associating a second value with the second body part, wherein the second value is based on the second difference and the second difference is less than the first difference;
determining, based on the second video data, a sixth location of a fourth body part of the second user, wherein the fourth body part corresponds to the second body part of the first user;
determining a fourth difference between the second location and the sixth location; and
determining that the second value is associated with a lesser difference than the first value;
wherein the output is indicative of the third difference in response to the second value being associated with the lesser difference.

11. The method of claim 4, further comprising:
determining an average position based on the first data;
accessing second video data representing a second user performing the activity;
determining, based on the second video data, a first pose of the second user at a third time and a second pose of the second user at a fourth time;
determining that the first pose corresponds to the average position;
determining that the second pose corresponds to the average position; and
based on correspondence between the first pose, the second pose, and the average position, determining performance of the activity by the second user.

12. The method of claim 4, further comprising:
accessing second video data representing a second user performing the activity;
determining, based on the second video data, a first pose of the second user at a third time and a second pose of the second user at a fourth time;
generating second data that represents a third position of the second user at the third time and a fourth position of the second user at the fourth time; and
determining, based on the second data, third data that represents a rate of movement of the second user from the third time to the fourth time; and
determining output indicative of one or more of the rate of movement or energy associated with movement by the second user from the third time to the fourth time.

13. A system comprising:
one or more memories storing computer-executable instructions; and
one or more hardware processors to execute the computer-executable instructions to:
access first video data representing a first user performing an activity;
determine, based on the first video data, a first location of a first body part of the first user at a first time;
determine, based on the first video data, a second location of the first body part at a second time;
determine, based on the first video data, a third location of a second body part of the first user at the first time;
determine, based on the first video data, a fourth location of the second body part at the second time;
determine that a first difference between the first location and the second location is greater than a second difference between the third location and the fourth location; and
generate first data that represents a first position of the first user at the first time and a second position of the first user at the second time based at least in part on the first location and the second location.

14. The system of claim 13, further comprising computer-executable instructions to:
determine, based on the first video data, a first plurality of points representing a first pose of the first user at the first time, wherein at least one point of the first plurality of points corresponds to the first body part; and
determine, based on the first video data, a second plurality of points representing a second pose of the first user at the second time, wherein at least one point of the second plurality of points corresponds to the second body part.

15. The system of claim 13, further comprising computer-executable instructions to:
determine a first value for the first location and the second location, wherein the first value is based on a first magnitude of the first difference; and
determine a second value for the third location and the fourth location, wherein the second value is based on a second magnitude of the second difference and the second magnitude is less than the first magnitude;
wherein the first data is further based on the first value and the second value.

16. The system of claim 13, further comprising computer-executable instructions to:
determine, based on the first video data, a fifth location of the first body part at a third time between the first time and the second time;
determine, based on the first video data, a sixth location of the second body part at the third time;
determine a third difference between the first location and the fifth location;
determine a fourth difference between the third location and the sixth location; and
determine that the third difference is less than the fourth difference;
wherein the first data is further based on the third difference and the fourth difference.

17. The system of claim 13, further comprising computer-executable instructions to:
access second video data representing a second user performing the activity;
determine, based on the second video data, a fifth location of a third body part of the second user at a third time;
determine, based on the second video data, a sixth location of the third body part at a fourth time;
generate second data that represents a third position of the second user at the third time and a fourth position of the second user at the second time based on the fifth location and the sixth location;
determine that the third position of the second user corresponds to the first position of the first user; and
determine completion of the activity based on correspondence between the third position and the first position.

18. The system of claim 17, further comprising computer-executable instructions to:
determine an average position for the first user based on the first data;
determine a first difference between the first position and the average position;
determine a second difference between the second position and the average position;
and
determine that the first difference is greater than the second difference;
wherein correspondence between the third position and the first position is determined based on the first difference being greater than the second difference.

19. The system of claim 13, further comprising computer-executable instructions to:
access second video data representing a second user performing the activity;

determine, based on the second video data, a fifth location of a third body part of the second user at a third time;

determine a third difference between the fifth location and the first location; and determine an output indicative of the third difference.

20. The system of claim 19, further comprising computer-executable instructions to:

determine, based on the first video data, a sixth location of a fourth body part of the first user at the first time;

determine, based on the first video data, a seventh location of the fourth body part at the second time;

determine a fourth difference between the first location and the second location;

determine a fifth difference between the fifth location and the sixth location; and determine that the fourth difference is greater than the fifth difference;

wherein the fourth difference is determined between the first location and the second location based on the fourth difference being greater than the fifth difference.

21. A system comprising:

one or more memories storing computer-executable instructions; and one or more hardware processors to execute the computer-executable instructions to:

determine, based on first video data, a first plurality of points that represent a first pose of a first user at a first time;

determine, based on the first video data, a second plurality of points that represent a second pose of the first user at a second time;

determine a first location of a first body part of the first user based on the first plurality of points, and a second location of the first body part of the first user based on the second plurality of points;

determine a third location of a second body part of the first user based on the first plurality of points, and a fourth location of the second body part of the first user based on the second plurality of points;

determine that a first difference between the first location and the second location is greater than a second difference between the third location and the fourth location; and based on the first location and the second location, generate first data that represents one or more of: a first position of the first user at the first time or a second position of the first user at a second time.

* * * * *